INVENTOR.
Joseph J. Slomer
BY
Murray G. Gleason
ATTORNEY

INVENTOR.
Joseph J. Slomer
BY
Murray A. Fleeson
ATTORNEY

INVENTOR.
Joseph J. Slomer

Sept. 22, 1959            J. J. SLOMER            2,904,959
CONTROL CIRCUIT FOR FLUID PRESSURE SYSTEMS FOR
CRAWLER TREAD VEHICLES OR THE LIKE
Original Filed April 17, 1956            4 Sheets-Sheet 4

INVENTOR.
Joseph J. Slomer
BY
Murray A. Gleeson
ATTORNEY

United States Patent Office 2,904,959
Patented Sept. 22, 1959

2,904,959

CONTROL CIRCUIT FOR FLUID PRESSURE SYSTEMS FOR CRAWLER TREAD VEHICLES OR THE LIKE

Joseph J. Slomer, Chicago, Ill., assignor to Goodman Manufacturing Company, Chicago, Ill., a corporation of Illinois Continuation of application Serial No. 578,728, April 17, 1956. This application October 17, 1958, Serial No. 769,971

5 Claims.   (Cl. 60—53)

This invention relates to fluid pressure control circuits for supplying motive fluid to the tramming motors of a crawler tread operated vehicle, and to an improved arrangement whereby small volumes of fluid for such motors may be nicely regulated to maintain crowding movement only of the vehicle. This is a continuation of my application Serial No. 578,728, filed April 17, 1956, now abandoned.

Structure according to the present invention is especially suited for use with a boring type miner such as is disclosed in Robbins Patent No. 2,705,624, issued April 5, 1955, for Coal Mining Machine with Collapsible Head. Machines of the general type as disclosed in said patent must tram at a relatively high speed from one working point to another, but when in position against a working face the operation of the crawler tread motors is necessary only for good crowding effort and the low speed incident to the advance by the boring arms.

During such latter operation the fluid motors for each crawler tread must operate to give the machine straight line movement, since such machines are generally followed by belt conveying equipment for removal of the material from the working face. Accordingly, the drive motors for the crawler treads must be operated with small amounts of pressure fluid, which amount may vary between the drive motors.

It is a principal object of this invention to provide a fluid pressure control circuit operable over a wide range to supply motive fluid to the tramming motors of a mining machine.

Another object is to control the pressure fluid to each tramming motor within close limits, so that desired straight line movement during low speed crowding movement may be achieved.

Still another object is to provide a fluid pressure circuit having a vernier adjustment of its output whereby the motive fluid supplied to each of a pair of tramming motors may be nicely controlled, so as to insure the proper supply of such fluid for crowding of the boring arms against the working face in a mine, and to insure during such crowding straight line movement of the mining machine.

Other objects and important features of the invention will be apparent from a study of the specification following taken with the drawings, which together show a preferred embodiment of the invention and what is now considered to be the best mode of practicing the principles thereof. Other embodiments may be suggested to those having the benefit of the teachings herein, and such other embodiments are intended to be reserved especially as they fall within the scope and spirit of the subjoined claims.

In the drawings:

Figure 2a is a fragmentary sectional view of Figure 2, taken along line 2a—2a;

Figure 1:
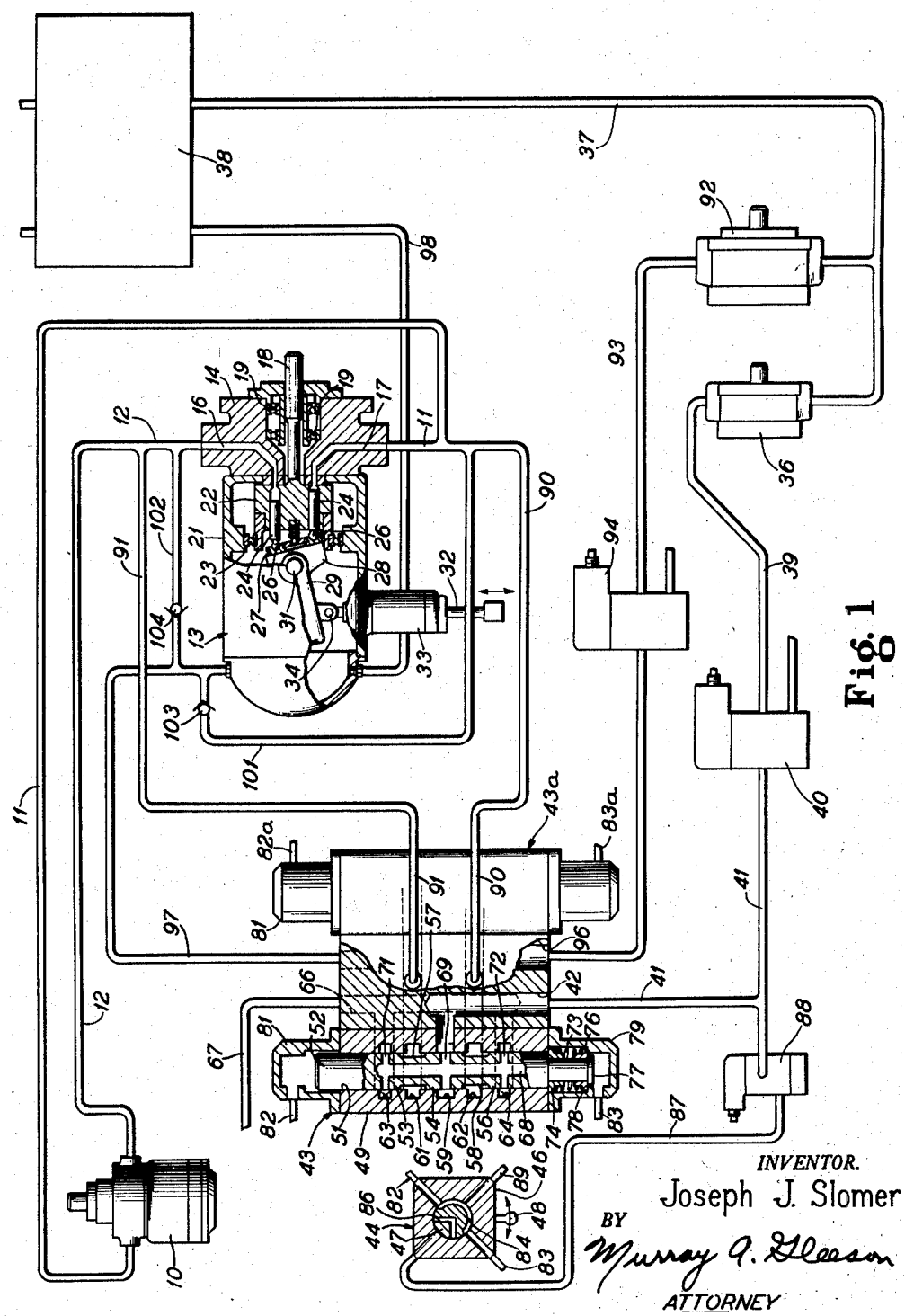
Figure 1 is a fluid pressure control circuit for a crawler tread operated vehicle or the like, said circuit having the improvements according to the present invention embodied therein.

Referring now to Figure 1 of the drawings, there is shown a fluid operated tramming motor 10 connected by a pair of connecting conduits or supply lines 11 and 12 to a main variable volume pump 13. For the purpose of description at this point line 11 may be considered as being connected to the output of the pump 13, and the line 12 as being connected from the tram motor 10 to the intake side of the pump 13.

The pump 13 consists of a pump housing 14 having a pump intake port 16 connected to the line 12 and an output port 17 connected to the line 11. The pump housing 14 has a shaft 18 supported therein upon bearings 19, and the shaft 18 extends within a wobble plate housing 21 or cooling chamber secured to the pump housing 14.

The shaft 18 has a rotor 22 integral therewith which extends within the wobble plate housing 21, and which is supported upon bearings 23. The rotor 22 has piston like plungers 24 therein, each of which is provided with a ball and socket connection 26 at the ends thereof to a socket plate 27 which is part of a wobble plate 28. The wobble plate 28 is integral with an arm 29 which pivots about a journal 31 supported in the housing 21. An actuating rod 32 retained in a guide 33 is pivotally connected at 34 to the arm 29 to rock the wobble plate 28.

The stroke of the plungers 24 may accordingly be regulated in accordance with the angle the wobble plate 28 makes with the axis of the shaft 18. Fluid is pumped by the plungers 24 from the intake port 16 and delivered to the output port 17 upon rotation of the rotor 22. The output from the pump 13 is regulated by movement of the actuating rod 32 which is controlled in its position by a vernier control mechanism, seen with reference to Figures 2 to 4 inclusive, and to be described in more detail as this specification proceeds.

In mining machines of the type disclosed in the aforesaid Robbins patent there is provided a tram motor 10, not shown, for each crawler tread. Each tram motor is connected in a hydraulic system identical with that shown in Figure 1. Each of the tram motors is supplied with small amounts of pressure fluid from the variable volume pump 13 during crowding of the boring arms seen in the aforesaid Robbins patent against the working face of a mine, and the direction of the machine during such crowding may be controlled nicely by accurately positioning the actuator rod 32 for each wobble pump 13.

During tramming operation at higher speeds each of the tram motors must be provided with auxiliary sources of pressure fluid, and to this end means are provided whereby the output from auxiliary pumps is made available.

Such means includes an auxiliary pump 36 connected by a supply line 37 to a tank or reservoir 38. A pressure line 39 from the pump 36 is connected through a pressure relief valve 40, a line 41 from valve 40 being connected to a passageway 42 of a slave valve 43. The output from the pump 36 is controlled by a slave valve 43 which is actuated by a servo valve 44 consisting of a valve body 46 and a rotatable valve member 47 which is shifted in its position by an actuating handle 48.

The slave control valve 43 includes a valve body 49 having a bore 51 therein. The operating means being a spool valve member 52 slidable in the bore 51 and having lands 53, 54 and 56, lands 53 and 54 being spaced by a portion of reduced diameter 57, and lands 54 and 56 being spaced by a portion of reduced diameter 58. The valve body 49 has a pressure port 59 communicating with the pressure passageway 42, and working ports 61 and 62, each of which flanks the pressure port 59. The two pressure ports 61 and 62 are flanked respectively by ports 63 and 64 which lead to a passageway 66 connected to a line 67. Other hydraulically operated devices, not shown, may be connected to the line 67 to receive pressure fluid from the pump 36 by way of the slave valve 43, or in the alternative, the line 67 may be connected to some other part of the described circuit, for example, the circuit supplied by line 97.

When the valve spool member 52 is in the centered position shown, the output from the pump 36 passes to the passageway 66 and line 67 by means of an axial bore 68 in the spool valve member 52 and by a passageway 69 in the spool in alignment with the pressure passageway 59 and by passageways 71 and 72 in alignment respectively with the tank ports 63 and 64.

The spool valve member 52 is normally biased in the centered position shown by means of a spring 73 held between a pair of collars 74 and 76 supported on an extension 77 from the spool member 52, collar 74 normally being in abutting relationship with the end of the valve body 49, and the other collar 76 during such centered position abutting a shoulder 78 within an end cap 79.

The other end of the valve body 49 is also provided with an end cap 81, said end cap being connected by a conduit 82 to the servo valve 44. End cap 79 is similarly connected by a conduit 83 connected to the servo valve 44.

The valve member 47 has an annular groove 84 therein which connects the two conduits 82 and 83 to balance the pressures across the spool 52 to maintain the spool in the centered position shown. The valve member 47 is also provided with a passageway 86 which can be shifted on rotation of valve member 47 to a position to connect the conduit 82 or 83 to a pressure line 87 which receives fluid at reduced pressure past a reducing valve 88 connected to the line 41. When the actuating handle 48 is shifted to a position to cause the communication between the line 87 and the line 83 the pressure at the lower end of the valve spool member 52 (as viewed in Fig. 1) will cause it to shift upward. During such operation the pressure at the upper end of the spool valve member 52 is relieved to tank by a tank conduit 89 in the valve body 46.

When the valve spool member 52 is thus shifted upward, the reduced diameter portion 58 will be in alignment with the pressure port 59, and fluid under pressure will flow from the pressure port 59 to the working port 62. A pressure line 90 is connected to the pressure port 62 and the flow from the pump 36 is connected to the line 90 to join with the fluid pumped by the variable volume pump 13.

Under such condition the reduced diameter portion 57 will be shifted to a position to cause communication of the working port 61 with the tank port 63, the working port 61 being connected by a conduit 91 joining with the return line 12 to the pump 13.

It is believed evident that shifting of the actuating handle in the opposite direction will cause shifting of the spool valve member 52 in a corresponding direction to cause line 90 to become a return line and line 91 to become a pressure line. Concurrent with such operation the actuator rod 32 is shifted to reverse the inclination of the wobble plate 28, so that line 11 becomes a return line to the pump 13 and line 12 becomes the output line from the pump 13.

As seen in Figure 1 there is also provided a supplemental slave valve 43a which operates in the identical fashion upon actuation of the slave valve 43. It likewise is provided with conduits 83a and 82a which connect respectively with the conduits 83 and 82, so that the action of the slave valve 43 is coincident with the action of the slave valve 43a.

The slave valve 43a controls the flow of fluid from a second auxiliary pump 92 which also receives fluid from tank 38 by means of the line 37. The output from pump 92 moves in a pressure line 93 past a pressure relief valve 94 and to a passageway 96 in the auxiliary slave valve 43a. The fluid pumped by the pump 92 is connected by a line 97 from slave valve 43a to the interior of the wobble plate housing 21 to cool the pump 13, the pressure fluid being returned by a line 98 to the tank 38.

The output from the pump 92 may be at times employed to replace any fluid lost to the system by operation of the fluid motor 10, variable volume pump 13 and the several valves shown, and to this end the line 97 has branching therefrom lines 101 and 102. Line 101 is connected to one side of the variable volume pump 13 and the other line 102 is connected to the other side thereof. The lines 101 and 102 are provided respectively with check valves 103 and 104, which are blocked according to the direction of the output from the variable volume pump 13. That is to say, valve 103 is blocked when line 11 is the pressure line from the pump 13, and valve 104 is blocked when line 12 is the pressure line from the pump 13. Fluid then is available through the unblocked check valve to make up such losses.

The output from the pump 92 is manifested in the pressure line 90 when the slave valve 43a has its plunger shifted upward as was previously described with respect to slave valve 43. Line 91 under such condition becomes the return line for the output from the pump 92. However, the excess of fluid from the pump 92 is made available except for such times to supply coolant liquid to the wobble plate housing 21 by means of the passageways through valve 43a to the coolant supply line 97.

Figure 2:
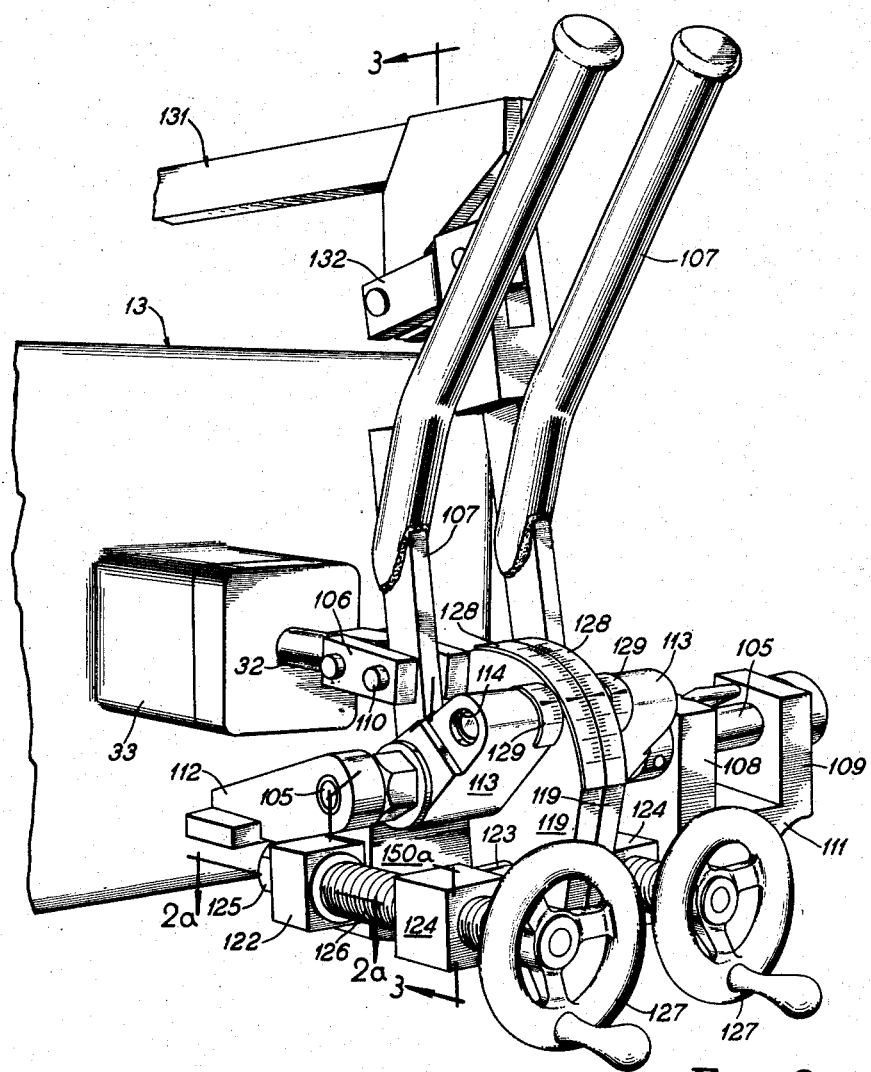
Figure 2 is a perspective view of a manual control having a vernier adjustment for controlling within close limits the output of a pump included in the control circuit seen in Figure 1.
Figure 3:
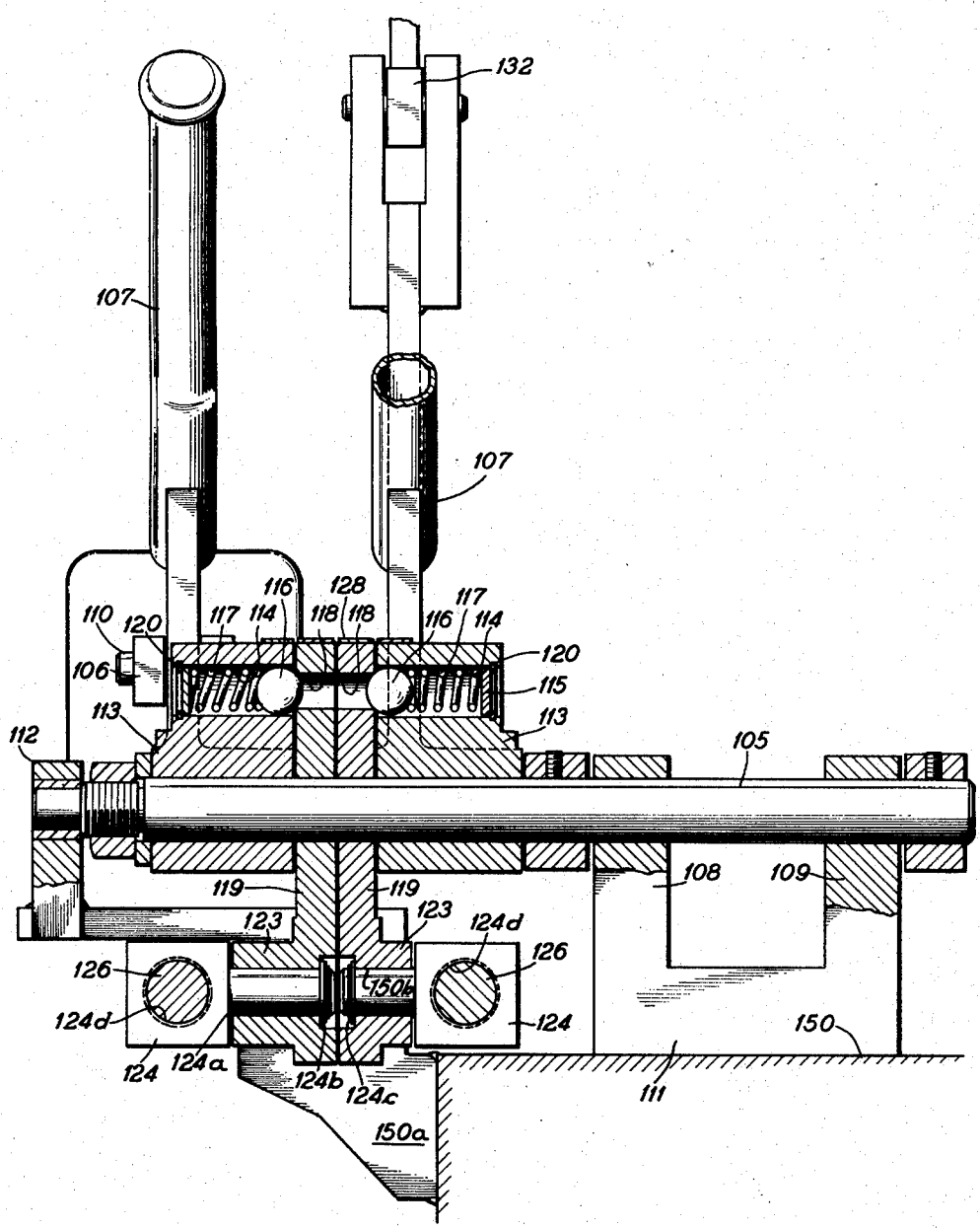
Figure 3 is a cross section taken substantially along the line 3—3 of Figure 2 looking in the direction of the arrows.
Figure 4:
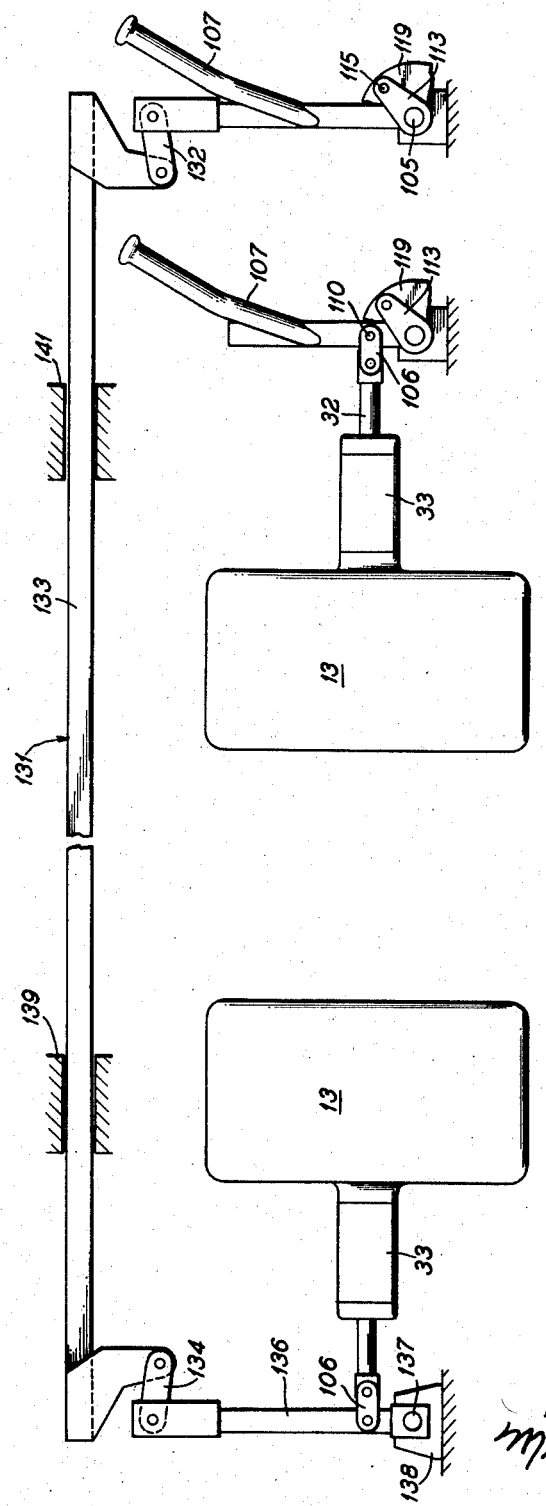
Figure 4 is an elevational view of a linkage for controlling a pair of variable volume pumps seen in Figure 1, each pump being located on opposite sides of such crawler tread operated vehicle.

The actuator rods 32, see Figures 2 to 4 inclusive, are mounted in position to one side of the mining machine of the type shown in the aforesaid Robbins patent so that the amount of fluid pumped by the variable volume pumps 13 may be adjusted as desired for the crowding action of the machine against a working face. An operator's station, not shown, is provided to one side of the machine for conjoint operation of the several pumps shown in this application.

Each actuator 32 is connected by a linkage 106 to a control handle 107 which is pivoted to a shaft 105 supported in a bifurcated bracket 111 having arms 108 and 109 extending upward from a frame member 150 of the machine. The other end of the shaft 105 is additionally supported in a bracket 112 extending from the frame of the machine.

Figure 2A:
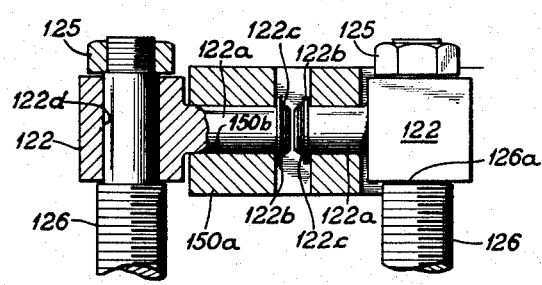

Each arm 107 has a hub 113 integral therewith which is arranged to swivel with its arm upon the shaft 105, and as shown in Figure 3 the hub 113 is provided with a recess 114 for a detent ball 116 biased by the spring 117. A washer 115 and a C-ring 120 provide a backing abutment for the spring 117. The detent ball 116 is urged into a circular detent hole 118 in a detent plate 119, the latter being arranged to swivel upon stub shaft 105. The detent plate 119 has integral therewith an annular boss 123 extending therefrom. Swiveled onto the boss 123 is an internally threaded block or nut 124 having an integral pin 124a swivelly journaled within the boss and held in place by washer 124b and C-ring 124c. The internal threads 124d of the block 124 engage a screw shaft 126 having a hand wheel 127. The shaft 126 has a shoulder 126a which bears against a pivoted support block 122 (see Figure 2a). The inner end of shaft 126 has a reduced diameter portion rotatably journaled within an unthreaded bore 122d and is held onto the block by a nut 125. A transverse extension 122a is formed integral with the block 122 and is swiveled within a bore 150b formed in a frame extension 150a, being held in place by washer 122b and C-ring 122c. The plate 119 may be rotated on the shaft 105 by turning the hand wheel 127, to obtain a minor or vernier adjustment at which time the swivellable shaft 122a permits desired up and down freedom of movement of the shaft 126.

The plate 119 has a calibrated scale 128 which cooperates with a vernier scale 129 on the hub 113. When the zero mark on the vernier scale 129 aligns with the zero mark on graduated scale 128, the operator is apprised that the detent registers with the detent notch.

By rotating the hand wheels the two plates are rocked on the shaft 105. The output from each pump 13 is accordingly regulated for its proper crowding output to crowd the machine in a straight line direction. Normally, in rotating the hand wheel 127 to swivel the plate 119 on the shaft 105, the hub 113 and the operating handle 107 are carried therewith by means of the detent ball 116 and the detent opening 118.

The setting of the two plates 119 with respect to each other may thus be observed by the operator, and moreover, if the machine is trammed away from the working face and then returned thereto for further boring action, the pumps 13 may each be returned to the proper output for the boring operation. In demanding output from pump 13 in excess of that needed for crowding alone the arms 107 can be rocked to overcome the detent, and then returned to the previous setting.

As seen in Figure 4, the right hand operating lever 107 of Figure 2 is connected by a linkage indicated generally by the reference numeral 131 to operate the variable volume pump 13 and the fluid motor 10 on the side opposite the operator. Such a linkage includes a link 132 connected to operating handle 107 and to a crossover bar 133 in turn connected to a link 134 and an actuator lever 136 pivotally mounted at 137 to an abutment 138 on the opposite side of the machine. The lever 133 as seen in Figure 4 is suitably guided at guides 139 and 141.

The two arms 107 can each be rocked on their shafts 105 to override the detents described to give additional output from the variable volume pump 13. Rocking the arms inward (that is, toward the left in Figure 2) results in full output from the pump 13 in the forward direction. The pressure fluid through the motors 10 can be augmented by manipulating the servo valve 44 seen in Figure 1. Contrariwise the machine may be trammed in the reverse direction by moving the arms 107 outward (to the right in Figure 2), at the same time overriding the detents described. As in the forward tramming direction, the servo valve 44 and its slave valves 43 and 43a can be operated to augment the supply of fluid from the variable volume pumps 13 for fast tramming.

While the invention has been described in terms of a preferred embodiment thereof, its scope is intended to be limited only by the claims here appended.

I claim:

1. A control circuit for a fluid pressure system for providing pressure fluid to a fluid operated motor operable over a wide range in the amount of pressure fluid supplied thereto, comprising: a fluid operable motor, a main pump having a cooling chamber, a connecting conduit between said fluid motor and main pump, and means for augmenting the supply of pressure fluid to said motor during the operation thereof with pressure fluid greater in amount than that supplied by said main pump alone including a pair of auxiliary pumps, a servo valve, a pair of slave valves operable upon operation of said servo valve to supply additional pressure fluid to said fluid operated motor, one of said auxiliary pumps providing pressure fluid for actuation of said slave valve when said servo valve is operated, one of said slave valves communicating with the output of the said one auxiliary pump and operable in a non-actuated position thereof to bypass pressure fluid therefrom, and the other of said slave valves communicating with the output of the other of said auxiliary pumps and operable in a non-actuated position thereof to bypass pressure fluid therefrom to supply coolant liquid to the cooling chamber of said main pump, each of said slave valves having a working port communicating with the conduit connecting the motor and main pump, said working ports being connected to the output of the respective auxiliary pumps when said slave valves are in an actuated position, connections from the output of the other of said auxiliary pumps to opposite sides of the said main pump, and check valves in said connections operable in accordance with the direction of operation of said main pump to pass makeup fluid from said other auxiliary pump to said circuit.

2. A control circuit for a fluid pressure system for providing pressure fluid to a fluid operated motor operable over a wide range in the amount of pressure fluid supplied thereto, comprising: a fluid operable motor, a main pump having a cooling chamber, a connecting conduit between said fluid motor and main pump, and means for augmenting the supply of pressure fluid to said motor during the operation thereof with pressure fluid greater in amount than that supplied by said main pump alone including a pair of auxiliary pumps, a servo valve, a pair of slave valves operable upon operation of said servo valve and operable to supply additional pressure fluid to said fluid operated motor, one of said auxiliary pumps providing pressure fluid for actuation of said slave valves when said servo valve is operated, one of said slave valves communicating with the output of the said one auxiliary pump and operable in a non-actuated position thereof to bypass pressure fluid therefrom, and the other of said slave valves operable in a non-actuated position thereof to bypass fluid to supply coolant liquid to the cooling chamber of said main pump, connections from the output of the other of said auxiliary pumps to opposite sides of the said main pump, and check valves in said connections operable in accordance with the direction of operation of said main pump to pass make up fluid from said other auxiliary pump to said circuit.

3. A control circuit for a fluid pressure system for providing pressure fluid to a fluid operated motor operable over a wide range in the amount of pressure fluid supplied thereto, comprising: a fluid operable motor, a variable volume pump having a cooling chamber, means for regulating the output from said pump, a connecting conduit between said fluid motor and variable volume pump, and means for augmenting the supply of pressure fluid to said motor during the operation thereof with pressure fluid greater in amount than that supplied by said main pump alone including a pair of auxiliary pumps, a servo valve, a pair of slave valves connected in parallel and operable upon operation of said servo valve to a position to supply additional pressure fluid to said fluid operated motor, one of said auxiliary pumps providing pressure fluid for actuation of said slave valves when said servo valve is operated to actuate said slave valves, one of said slave valves being operable in a non-actuated position thereof to bypass fluid therethrough from the said one auxiliary pump, and the other of said slave valves being operable in a non-actuated position to bypass pressure fluid therethrough from the other of said auxiliary pumps to the cooling chamber of said variable volume pump, and working ports in each of said slave valves communicating with the conduit connecting the motor and variable volume pump, said working ports being connected to the output from said auxiliary pumps when said slave valves are actuated.

4. A control circuit for a fluid pressure system for providing pressure fluid to a fluid operated motor operable over a wide range by the amount of pressure fluid supplied thereto, comprising: a fluid operable motor, a main pump having a cooling chamber, a connecting conduit between said fluid motor and main pump, and means for augmenting the supply of pressure fluid to said motor during the operation thereof with pressure fluid greater in amount than that supplied by said main pump alone including a pair of auxiliary pumps, a servo valve, a pair of slave valves operable upon operation of said servo valve and operable to supply additional pressure fluid to said fluid operated motor, one of said slave valves being operable in a non-actuated position thereof to bypass fluid therethrough from one of said auxiliary pumps, and the other of said slave valves being operable when in a non-actuated position to bypass pressure fluid therethrough from the other of said auxiliary pumps to said main pump to supply coolant liquid to the cooling chamber of said main pump.

5. A control circuit for a fluid pressure system for providing pressure fluid to a fluid operated motor operable over a wide range by the amount of pressure fluid supplied thereto, comprising: a fluid operable motor, a variable volume pump having a cooling chamber, means for regulating the output from said pump, a connecting conduit between said fluid motor and variable volume pump, and means for augmenting the supply of pressure fluid to said motor during the operation thereof with pressure fluid greater in amount than that supplied by said variable volume pump alone including a pair of auxiliary pumps, a servo valve, a pair of slave valves operable upon operation of said servo valve and operable to supply additional pressure fluid to said fluid operated motor, one of said slave valves being operable in a non-actuated position thereof to bypass fluid therethrough from one of said auxiliary pumps, and the other of said slave valves being operable when in a non-actuated position to bypass pressure fluid therethrough from the other of said auxiliary pumps to said variable volume pump to supply coolant liquid to the cooling chamber of said variable volume pump.

References Cited in the file of this patent
UNITED STATES PATENTS

| | | |
|---|---|---|
| 2,042,247 | Blood | May 26, 1936 |
| 2,473,711 | Kearns et al. | June 21, 1949 |